(12) United States Patent
Kan et al.

(10) Patent No.: US 11,644,838 B2
(45) Date of Patent: *May 9, 2023

(54) LOW MOBILITY ASSISTANCE FOR AUTONOMOUS VEHICLES PASSENGERS

(71) Applicant: GM Cruise Holdings LLC, San Francisco, CA (US)

(72) Inventors: Daniel Kan, San Francisco, CA (US); Jessica Uelmen, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,946

(22) Filed: Feb. 9, 2022

(65) Prior Publication Data

US 2022/0171391 A1 Jun. 2, 2022

Related U.S. Application Data

(63) Continuation of application No. 16/725,530, filed on Dec. 23, 2019, now Pat. No. 11,281,220.

(51) Int. Cl.
*G05D 1/00* (2006.01)
*G01C 21/34* (2006.01)
*B60W 60/00* (2020.01)
*G06N 20/00* (2019.01)

(52) U.S. Cl.
CPC ........... *G05D 1/0088* (2013.01); *B60W 60/00* (2020.02); *G01C 21/3438* (2013.01); *G01C 21/3484* (2013.01); *G05D 2201/0213* (2013.01); *G06N 20/00* (2019.01)

(58) Field of Classification Search
CPC ........ G05D 1/0088; G05D 2201/0213; B60W 60/00; G01C 21/3438; G01C 21/3484; G06N 20/00
See application file for complete search history.

(56) References Cited

U.S. PATENT DOCUMENTS

| | | |
|---|---|---|
| 2018/0136656 A1 | 5/2018 | Rasmusson, Jr. et al. |
| 2018/0188731 A1 | 7/2018 | Matthiesen et al. |
| 2019/0066515 A1* | 2/2019 | Dyer ...................... G01C 21/32 |
| 2021/0089788 A1* | 3/2021 | Engle .................... G08G 1/202 |

FOREIGN PATENT DOCUMENTS

WO 2019023324 A1 1/2019

* cited by examiner

*Primary Examiner* — Michael J Zanelli
(74) *Attorney, Agent, or Firm* — Polsinelli PC (57) ABSTRACT

The present technology is effective to cause at least one processor to determine, based upon attributes of a sidewalk section and a height of a portion of an autonomous vehicle, a potential location for pick-up or drop-off of a passenger by the autonomous vehicle and navigate the autonomous vehicle to the potential location for pick-up or drop-off.

20 Claims, 4 Drawing Sheets

LOW MOBILITY ASSISTANCE FOR AUTONOMOUS VEHICLES PASSENGERS

CROSS-REFERENCE TO RELATED APPLICATIONS

This application claims priority to U.S. patent application Ser. No. 16/725,530, filed on Dec. 23, 2019, entitled "LOW MOBILITY ASSISTANCE FOR AUTONOMOUS VEHICLE PASSENGERS," the content of which is incorporated herein by reference in its entirety.

TECHNICAL FIELD

The present technology relates to providing assistance based on curb heights of pick-up and drop-off locations and more particularly to recommending preferred loading zones based on curb heights for autonomous vehicle passengers.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

When a vehicle stops to pick up and/or drop off passengers, the vehicle may be difficult to enter and/or cause traffic for other vehicles on the road. Human drivers use their judgment to assess which pick-up or drop-off locations may be suitable for different passengers.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for a mechanism by which an autonomous vehicle can interact with a passenger to identify a specific loading area near a location to which the autonomous vehicle was requested to stop. While current rideshare technologies commonly invite a passenger to enter a pick-up and/or drop-off location, and may even suggest specific locations nearby the pick-up and/or drop-off location in which to enter or exit the rideshare vehicle, these technologies are focused on route efficiency. These technologies can rely on a driver to handle more nuanced selections of where exactly to stop the car. For example, a human driver can identify a large puddle and slightly adjust the location in which the car ultimately stops for loading.

Autonomous vehicles actually have access to data that human drivers do not, and it would be helpful if the autonomous vehicles can utilize this data to also make nuanced decisions to adjust where the vehicle stops. In some embodiments, the autonomous vehicle will also need a mechanism to communicate these actions to a passenger.

In some embodiments, the present technology can address the above problems by utilizing data about curb height to make decisions about where the autonomous vehicle should stop. In some embodiments, information about curb height can be coupled with information in a passenger's user profile to identify a better stopping location to facilitate loading (including unloading) of the autonomous vehicle.

Figure 1:
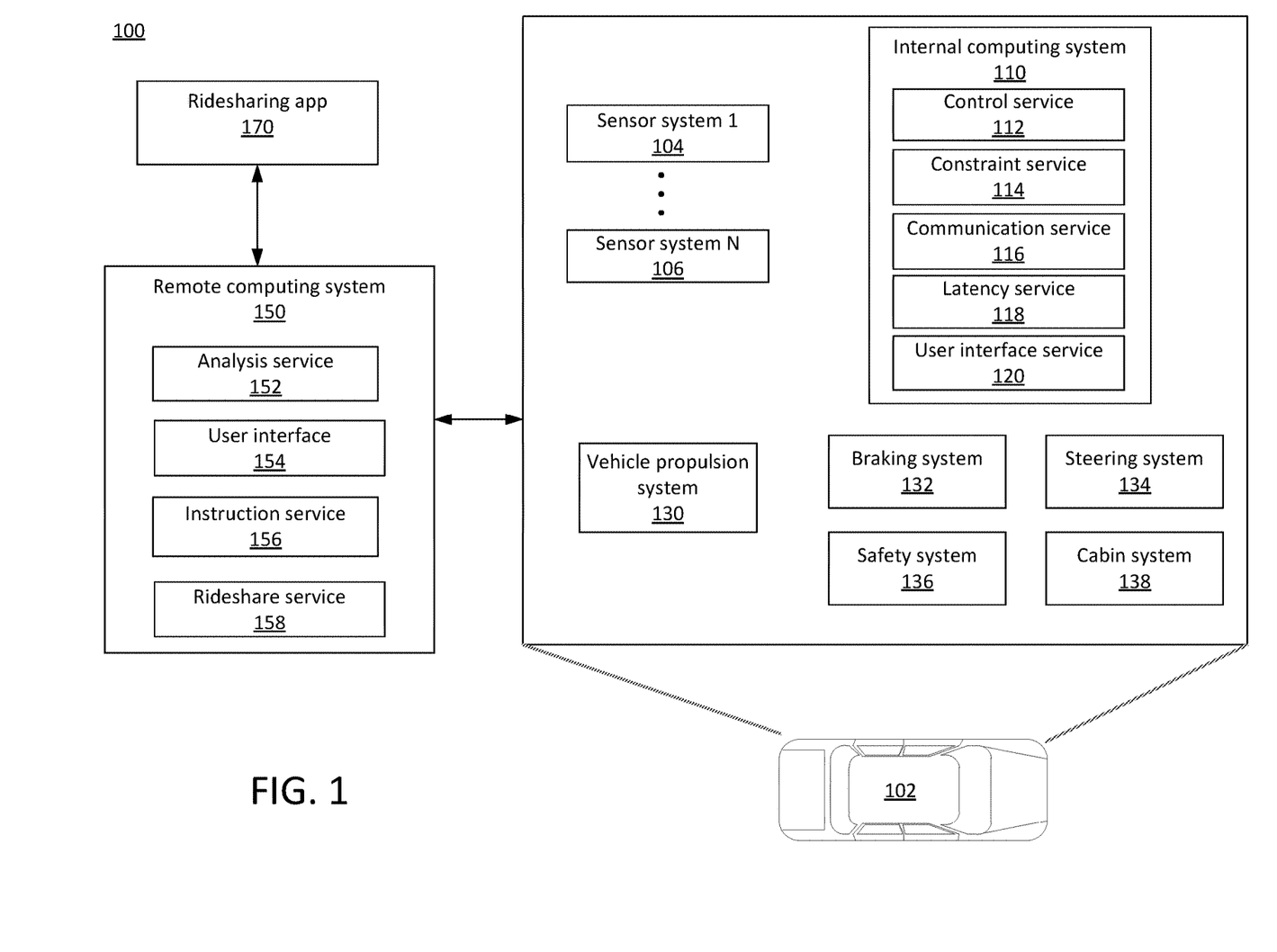
FIG. 1 shows an example system for operating an autonomous vehicle in accordance with some aspects of the present technology.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2:
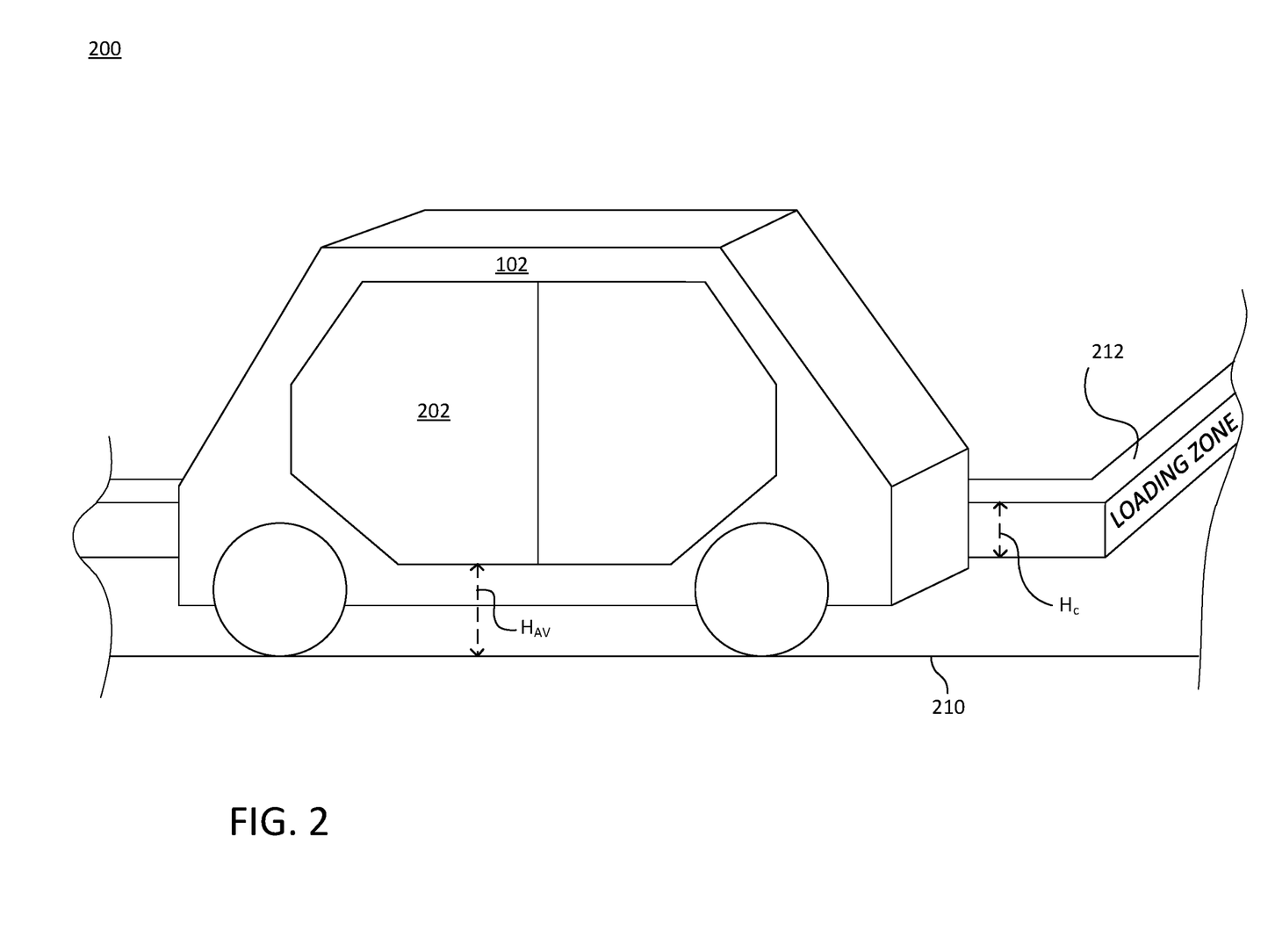
FIG. 2 shows an example environment of an autonomous vehicle by a sidewalk section in accordance with some aspects of the present technology.

FIG. 2 shows an example environment 200 of the autonomous vehicle 102 on a road or ground 210 adjacent to a sidewalk section 212. The autonomous vehicle 102 has at least one door 202. Furthermore, an autonomous vehicle height HAY measures a height of a portion of the autonomous vehicle 102 from the road 210. More specifically, the portion of the autonomous vehicle 102 may be a lower end of the door 202 of the autonomous vehicle 102. Although not shown, it is further contemplated that the portion of the autonomous vehicle 102 may be higher than the lower end of the door 202 when a sidewall exists and defines a footwell in the autonomous vehicle 102. Thus, the portion of the autonomous vehicle 102 may be the level, over which a passenger of the autonomous vehicle 102 may step over or off of to enter or exit the autonomous vehicle 102.

Similarly, the sidewalk section 212 may have associated attributes, including but not limited to, curb heights, height differentials, dips, sewer areas, zone classifications, construction indicators, quality measurements, etc. For example, in FIG. 2, the sidewalk section 212 is associated with attributes having a respective curb height $H_c$, measuring the height of a distal upper level to the ground 210. Similarly, in FIG. 2, the sidewalk section 212 is associated with attributes having a zone classification of a "LOADING ZONE."

Figure 3:
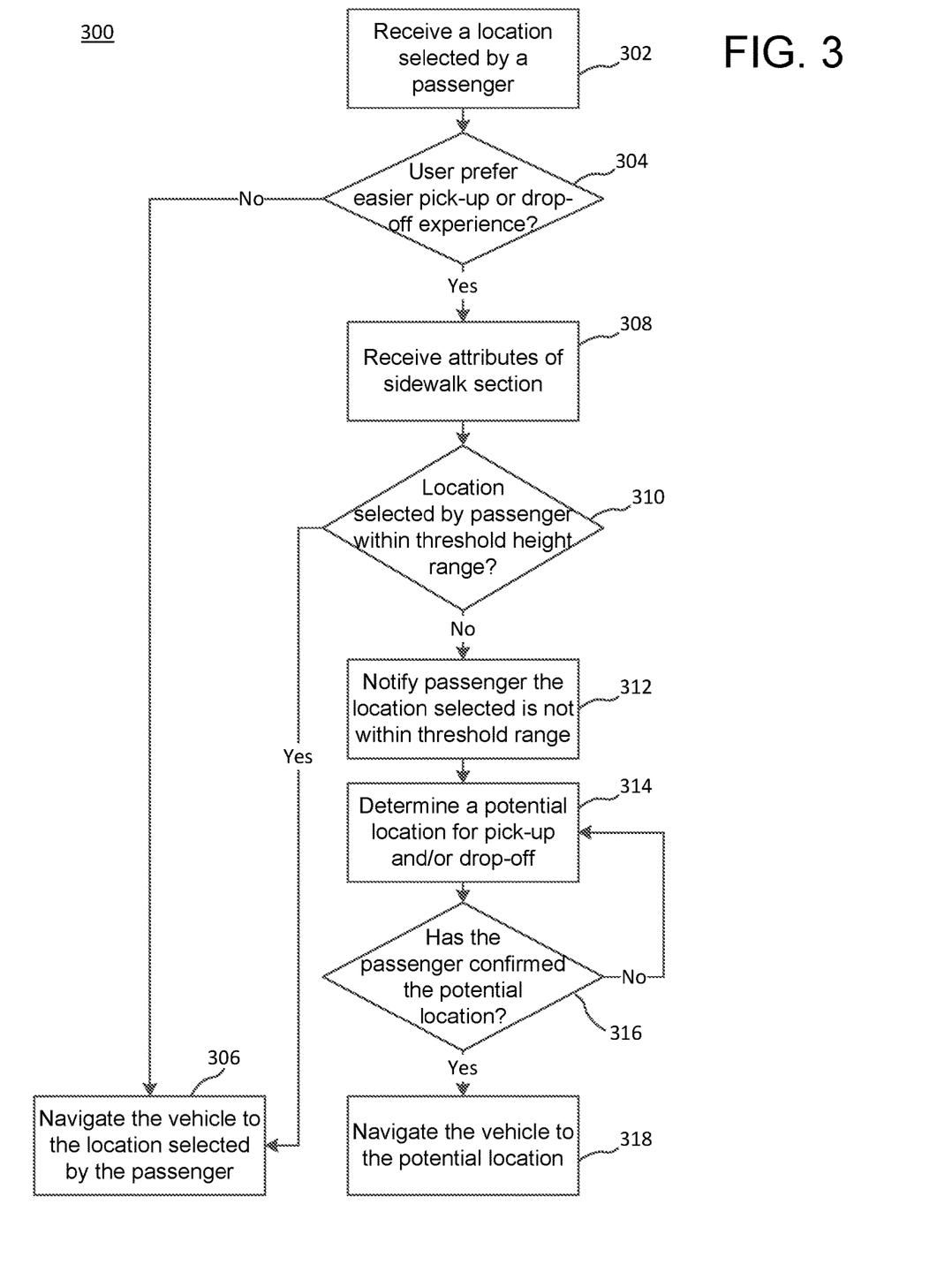
FIG. 3 is a flow diagram that illustrates an example process for providing assistance to autonomous vehicle passengers in accordance with some aspects of the present technology.

FIG. 3 is a flow diagram that illustrates an example process 300 for providing assistance to autonomous vehicle passengers.

The process 300 begins when the internal computing system 110 receives 302 a location selected by a user or passenger for pick-up or drop-off by the autonomous vehicle 102. In some embodiments, the selected location may have been selected by the passenger in the ridesharing application 170 and transmitted to the remote computing system 150, from which the internal computing system 110 receives 302 the selected location. In some embodiments, the internal computing system 110 receives 302 the selected location through the user interface service 120. The selected location is associated with a location sidewalk section having a respective location curb height. The location sidewalk section is the sidewalk section 212 associated with the selected location, while the respective location curb height is the respective curb height $H_c$ of the sidewalk associated with the selected location.

The internal computing system 110 may then determine 304 whether the passenger prefers an assisted or easier experience for pick-up or drop-off. In some embodiments, the passenger may have a passenger profile, in which the passenger has indicated a preference for the assisted or easier experience. Thus, in these embodiments, the internal computing system 110 may access the passenger profile to determine whether the passenger prefers the easier experience. Similarly, in some embodiments, the internal computing system 110 may determine through indirect characteristics and/or notifications that the passenger prefers the easier experience. For example, the passenger may indicate in the passenger profile or via the user interface 120 that the passenger has low mobility; thus, the internal computing system 110 may determine that due to the low mobility, the passenger would prefer an easier experience. In some embodiments, the internal computing system 110 may prompt to the passenger via the user interface service 120 whether the passenger prefers the easier experience and receive a choice from the passenger to determine whether the passenger prefers the easier experience.

If the internal computing system 110 determines 304 that the passenger does not prefer the easier experience, then the internal computing system 110 continues directly to navigate 306 the autonomous vehicle 102 to the selected location.

If the internal computing system 110 determines that the passenger does prefer the easier experience, then the internal computing system 110 receives 308 attributes of a sidewalk section 212 associated with the location selected by the passenger. More specifically, the internal computing system 110 receives 308 at least the respective location curb height of the location sidewalk section associated with the selected location. In some embodiments, the attributes may further include a height differential, which is defined by a difference in height between the autonomous vehicle height $H_{AV}$ and the respective curb height. As will be discussed in further detail below, the internal computing system 110 may also receive 308 attributes of a sidewalk section within a threshold distance from a location selected by the passenger.

In some embodiments, the remote computing system 150 may have a map database. The map database may define, store, and/or and associate the attributes with sidewalk sections 212. Thus, the internal computing system 110 may receive the attributes of the sidewalk section from the map database. In other words, the attributes of the sidewalk section, such as the respective curb height and the height differential, are stored within and received from the map database.

In some embodiments, the internal computing system 110 receives 308 the attributes of the sidewalk section 212 through sensor systems 104-106 of the autonomous vehicle 102. More specifically, the sensor systems 104-106 observe and produce sensor data, which may include measurements that define the attributes. For example, the sensor data may have measurements associated with the respective curb height of the sidewalk section within the threshold distance. The sensor systems 104-106 then transmit the sensor data to the internal computing system 110, which interprets the sensor data and determines the attributes based upon the measurements of the sensor data. In other words, the attributes of the sidewalk section 212 are derived from the sensor data received from the sensor systems 104-106 of the autonomous vehicle 102. In some embodiments, the sensor data received from the sensor systems 104-106 of the autonomous vehicle 102 are added to and stored in the map database as the attributes of the sidewalk section 212 described above.

The internal computing system 110 then determines 310 whether the selected location or the location selected by the passenger is associated with a respective curb height within a threshold height range. More specifically, the internal computing system 110 determines 310 whether the respective location curb height of the location sidewalk section is within the threshold height range. Furthermore, the internal computing system 110 may also determine respective curb heights $H_c$ of sidewalk sections 212 within a threshold distance from the selected location.

The threshold height range may be defined based upon the autonomous vehicle height $H_{AV}$ and a threshold height differential. For example, the autonomous vehicle height $H_{AV}$ may be 30 centimeters off of the ground and the threshold height differential may be 10 centimeters from the autonomous vehicle $H_{AV}$. Thus, the threshold height range may be 20 centimeters to 40 centimeters. Therefore, if the respective curb height $H_c$ of the sidewalk section 212 is 35 centimeters, then the respective curb height $H_c$, and accordingly the location associated with the respective curb height $H_c$, is determined 310 to be within the threshold height range.

In some embodiments, the threshold height differential may be used to define a threshold height differential range, such that if a differential between the autonomous vehicle height $H_{AV}$ and the respective curb height $H_c$ (i.e. $|H_{AV}-H_c|$) is less than the threshold height differential range, then the respective curb height $H_c$ is within the threshold height range. For example, the threshold height differential may be 10 centimeters. Thus, if the differential between the autonomous vehicle height $H_{AV}$ and the respective curb height $H_c$ ($|H_{AV}-H_c|$) is 6 centimeters, then the respective curb height is within the threshold height differential range and accordingly the threshold height range.

If the internal computing system 110 determines 310 that the selected location is associated with a respective location curb height within the threshold height range, then the internal computing system 110 directly navigates 306 the autonomous vehicle 102 to the location selected by the passenger.

If the internal computing system 110 determines 310 that the selected location is not associated with a respective curb height within the threshold height range, then the internal computing system 110 notifies 312 the location selected by the passenger is not within the threshold height range.

Then, the internal computing system 110 determines 314, based upon attributes of the sidewalk section 212 within the threshold distance of the selected location, a potential location for pick-up and/or drop-off of the passenger by the autonomous vehicle 102. More specifically, the internal computing system 110 determines 314 the potential location based on at least one sidewalk section 212 that is within the threshold distance of the selected location and is within the threshold height range determined 310 above. Thus, the internal computing system 110 also 314 determines the potential location based upon the height of the portion of the autonomous vehicle (i.e. the autonomous vehicle Height $H_{AV}$) and the respective curb height $H_c$ of the sidewalk section.

In some embodiments, the internal computing system 110 may have first determined 310 a subset of sidewalk sections 212, such that the sidewalk sections 212 in the subset all are within the threshold distance and have a respective curb height $H_c$ within the threshold height range. In these embodiments, the internal computing system 110 may then select any sidewalk section 212 of the subset.

In other embodiments, the internal computing system 110 may not have first determined the subset of sidewalk sections 212. In these embodiments, the internal computing system 110 would cyclically determine 310 sidewalk sections 212 until a sidewalk section 212 is within the threshold distance and has a respective curb height $H_c$ within the threshold range. Then, the internal computing system 110 would determine the sidewalk section 212 as the potential location.

In some embodiments, the internal computing system may further determine 314 the potential location based upon a variety of other factors. For example, historical ingress speeds of the passenger and curb heights of sidewalk sections associated with the ingress speeds of the passenger may be stored in the passenger profile. The internal computing system 110 may determine, based upon the historical ingress speeds and the historical curb heights, a preference of the passenger for curb heights. Thus, the internal computing system 110 may further determine 314 the potential location for pick-up or drop-off based upon the preference. Similarly, the passenger profile may further have a height of the passenger. Thus, the internal computing system 110 may further determine 314 the potential location based on the height of the passenger stored in the passenger profile.

As yet another example, the internal computing system 110 may receive live traffic data from at least one other vehicle in an autonomous vehicle fleet. The live traffic data may indicate current traffic conditions and/or classify an availability of the potential location for pick-up or drop-off. Thus, the internal computing system 110 may determine 314 the potential location based upon the availability of the potential location.

Referring back to the threshold height range determination 310, it is further contemplated that, in some embodiments, the internal computing system 110 may determine 310 whether the respective curb heights $H_c$ of the sidewalk sections 212 within the threshold distance are within the threshold height range in addition to the respective location curb height of the selected location. Then, the internal computing system 110 would directly determine 314 the potential location from the sidewalk sections 212 within the threshold distance. Thus, in these embodiments, the potential location may still be the location the passenger selected.

Then, the internal computing system 110 determines 316 whether the passenger confirms the potential location. More specifically, the internal computing system 110 may send the potential location to the passenger and receive an answer from the passenger to confirm or reject the potential location for pick-up or drop-off. Accordingly, the answer may be an authorization from the passenger to confirm the potential location or a rejection to reject the potential location. In some embodiments, the sending of the potential location and receiving of the answer may occur between the internal computing system 110 and the ridesharing application 170 of the mobile device of the passenger through the remote computing system 150. Similarly, in some embodiments, the sending of the potential location and receiving of the answer may be accomplished through the user interface service 120 of the autonomous vehicle 102.

If the internal computing system 110 determines 316 that the passenger does not confirm the potential location, then the internal computing system 110 returns to determining 314 a new potential location.

As discussed above in some embodiments, the internal computing system 110 may have a subset of sidewalk sections that are within the threshold distance and the threshold height range. In these embodiments, the internal computing system 110 may remove the potential location that was rejected from the subset and return to determining 314 the potential location from the subset.

As discussed above, in some embodiments, the internal computing system 110 may determine attributes of sidewalk sections 212 cyclically and/or individually. In other words, in some embodiments the internal computing system 110 may determine attributes of individual sidewalk sections 212 one at a time. In these embodiments, the internal computing system 110 would return to receiving 308 attributes of sidewalk sections 212 within the threshold distance.

If the internal computing system 110 determines 316 that the passenger confirms the potential location, then the internal computing system 110 navigates 318 the autonomous vehicle 102 to the potential location.

Figure 4:
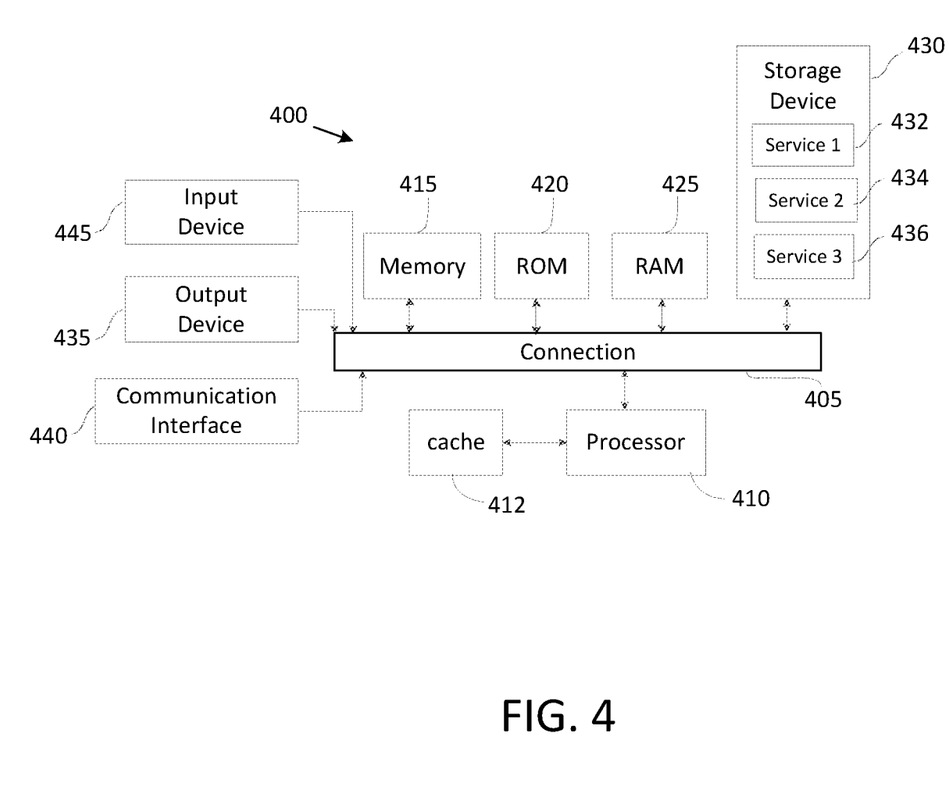
FIG. 4 shows an example of a system for implementing certain aspects of the present technology.

FIG. 4 shows an example of computing system 400, which can be for example any computing device making up internal computing system 110, remote computing system 150, (potential) passenger device executing rideshare app 170, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed:

1. A computer-implemented method comprising:
   determining, based upon attributes of a sidewalk section and a height of a portion of an autonomous vehicle, a potential location for pick-up or drop-off of a passenger by the autonomous vehicle; and
   navigating the autonomous vehicle to the potential location for pick-up or drop-off.

2. The computer-implemented method of claim 1, further comprising:
   receiving a location selected by the passenger,
   wherein the potential location for pick-up or drop-off of the passenger by the autonomous vehicle is within a threshold distance from the location selected by the passenger.

3. The computer-implemented method of claim 1, further comprising:
   determining that a location selected by the passenger is associated with a location sidewalk section having a respective location curb height not within a threshold height range; and
   notifying the passenger that the respective location curb height of the location sidewalk section is not within the threshold height range.

4. The computer-implemented method of claim 1, wherein the attributes of the sidewalk section are stored within and received from a map database.

5. The computer-implemented method of claim 1, further comprising:
   receiving, from sensors of the autonomous vehicle, sensor data having measurements associated with the respective curb height of the sidewalk section within the threshold distance,
   wherein the attributes of the sidewalk section are derived from the sensor data received from sensors of the autonomous vehicle.

6. The computer-implemented method of claim 1, further comprising:
   receiving a rejection of the potential location for pick-up or drop-off from the passenger;
   determining, based upon attributes of the sidewalk section and the height of a portion of the autonomous vehicle, a second potential location for pick-up or drop-off of the passenger by the autonomous vehicle; and
   selecting the second potential location as the potential location.

7. The computer-implemented method of claim 1, wherein the potential location is one location of a subset of sidewalk sections that are within a threshold distance of a location selected by the passenger and a threshold height range, and wherein the method further comprises:
   receiving a rejection of the potential location for pick-up or drop-off from the passenger;
   removing the potential location from the subset of sidewalk sections; and
   selecting a second potential location from the subset of sidewalk sections as the potential location.

8. The computer-implemented method of claim 1, wherein the sidewalk section is one of a subset of sidewalk sections, wherein each sidewalk section in the subset of sidewalk sections is within a threshold distance of a location selected by the passenger and are associated with a respective curb height that is within a threshold height range.

9. The computer-implemented method of claim 1, wherein the potential location is a selected location selected by the passenger, and wherein the selected location is associated with a respective location curb height within a threshold height range.

10. The computer-implemented method of claim 1, wherein determining the potential location is further based on a differential between a height of the sidewalk section and the height of the portion of the autonomous vehicle, and wherein the differential is within a threshold differential range.

11. A system comprising:
    a storage configured to store instructions;
    a processor configured to execute the instructions and cause the processor to:
    determine, based upon attributes of a sidewalk section and a height of a portion of an autonomous vehicle, a potential location for pick-up or drop-off of a passenger by the autonomous vehicle, and
    navigate the autonomous vehicle to the potential location for pick-up or drop-off.

12. The system of claim 11, wherein the processor is configured to execute the instructions and cause the processor to:
    receive a location selected by the passenger; and
    the potential location for pick-up or drop-off of the passenger by the autonomous vehicle is within a threshold distance from the location selected by the passenger.

13. The system of claim 11, wherein the processor is configured to execute the instructions and cause the processor to:
    determine that a location selected by the passenger is associated with a location sidewalk section having a respective location curb height not within a threshold height range; and
    notify the passenger that the respective location curb height of the location sidewalk section is not within the threshold height range.

14. The system of claim 11, wherein the attributes of the sidewalk section are stored within and received from a map database.

15. The system of claim 11, wherein the processor is configured to execute the instructions and cause the processor to:
    receive, from sensors of the autonomous vehicle, sensor data have measurements associated with the respective curb height of the sidewalk section within the threshold distance; and
    the attributes of the sidewalk section are derived from the sensor data received from sensors of the autonomous vehicle.

16. A non-transitory computer readable medium comprising instructions, the instructions, when executed by a computing system, cause the computing system to:
    determine, based upon attributes of a sidewalk section and a height of a portion of an autonomous vehicle, a potential location for pick-up or drop-off of a passenger by the autonomous vehicle; and
    navigate the autonomous vehicle to the potential location for pick-up or drop-off.

17. The computer readable medium of claim 16, wherein the computer readable medium further comprises instructions that, when executed by the computing system, cause the computing system to:

receive a location selected by the passenger; and the potential location for pick-up or drop-off of the passenger by the autonomous vehicle is within a threshold distance from the location selected by the passenger.

18. The computer readable medium of claim 16, wherein the computer readable medium further comprises instructions that, when executed by the computing system, cause the computing system to:

determine that a location selected by the passenger is associated with a location sidewalk section having a respective location curb height not within a threshold height range; and notify the passenger that the respective location curb height of the location sidewalk section is not within the threshold height range.

19. The computer readable medium of claim 16, the attributes of the sidewalk section are stored within and received from a map database.

20. The computer readable medium of claim 16, wherein the computer readable medium further comprises instructions that, when executed by the computing system, cause the computing system to:

receive, from sensors of the autonomous vehicle, sensor data have measurements associated with the respective curb height of the sidewalk section within the threshold distance; and the attributes of the sidewalk section are derived from the sensor data received from sensors of the autonomous vehicle.

* * * * *